United States Patent
Girardin

[15] 3,675,291
[45] July 11, 1972

[54] COMBINATION CUT-OFF AND CHAMFER TOOL

[72] Inventor: Howard N. Girardin, Grosse Pointe, Mich.
[73] Assignee: Empire Tool Company, Memphis, Mich.
[22] Filed: Feb. 19, 1971
[21] Appl. No.: 116,752

[52] U.S. Cl. ................................................29/97
[51] Int. Cl. ................................................B26d 1/04
[58] Field of Search ..................29/97, 93; 82/36, 37

[56] References Cited

UNITED STATES PATENTS

| | | |
|---|---|---|
| 3,316,617 | 5/1967 | Stein..............................29/97 |
| 2,940,160 | 6/1960 | Novkov..........................29/97 |
| 1,835,958 | 12/1931 | Luers.............................82/36 |

FOREIGN PATENTS OR APPLICATIONS

| | | |
|---|---|---|
| 1,168,001 | 10/1969 | Great Britain..................82/37 |
| 810,572 | 3/1959 | Great Britain..................29/97 |

*Primary Examiner*—Leonidas Vlachos
*Attorney*—Cullen, Settle, Sloman & Cantor

[57] ABSTRACT

A combination cutoff and chamfer tool for mounting on a compound rest of a lathe or the like machine tool in which the chamfer tool is mounted adjacent to one side of the cutoff tool and both, cutoff tool and chamfer tool, are clamped together within the tool holder by means of a mechanical clamp device; the chamfer tool can be adjusted longitudinally relative to the cutting edge of the cutoff tool.

5 Claims, 4 Drawing Figures

PATENTED JUL 11 1972 3,675,291
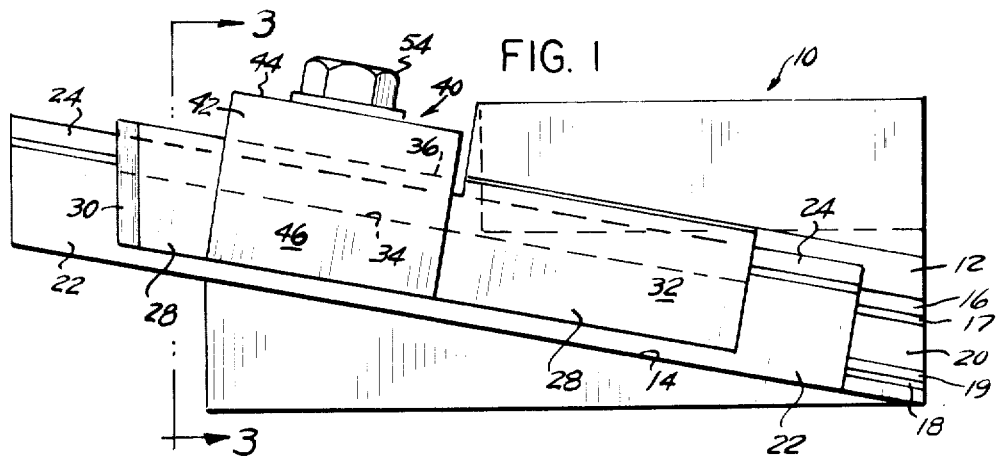
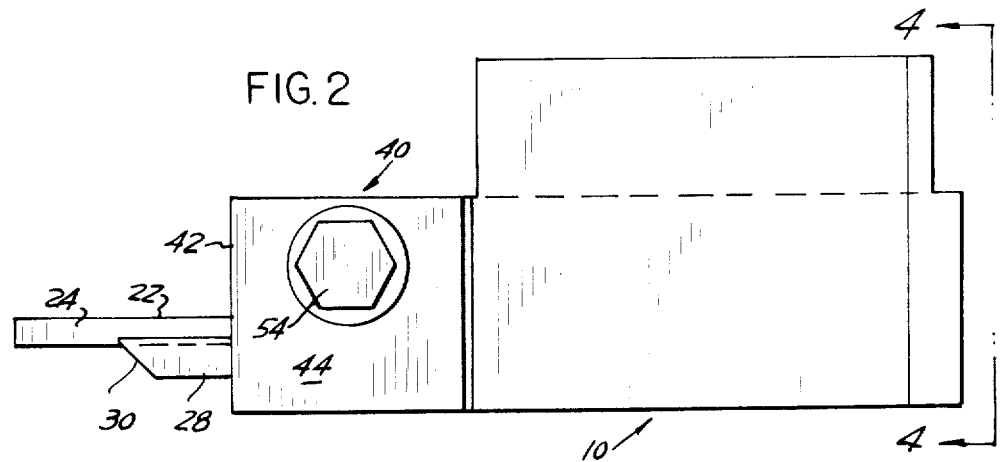
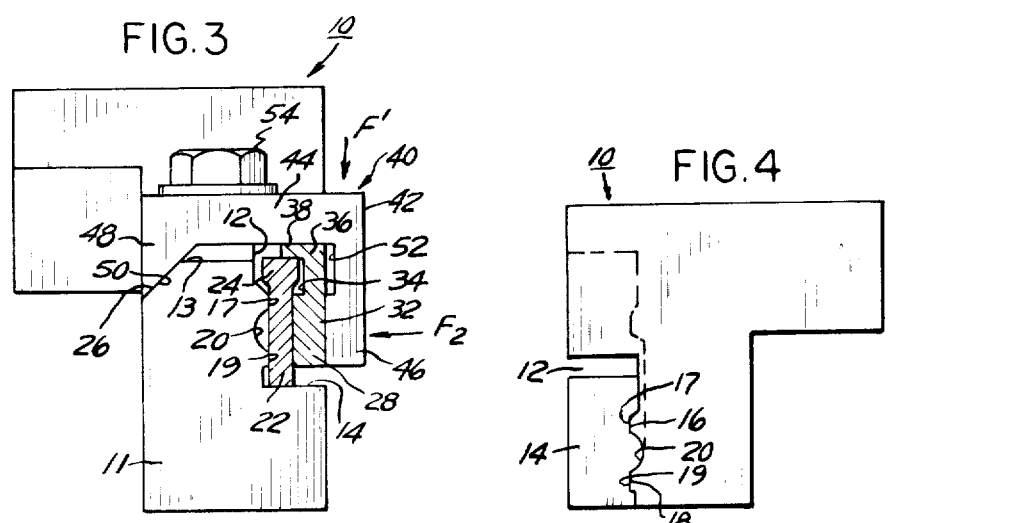
INVENTOR
HOWARD N. GIRARDIN
BY Cullen, Settle, Sloman & Cantor
ATTORNEYS 3,675,291

COMBINATION CUT-OFF AND CHAMFER TOOL

BACKGROUND AND SUMMARY OF THE INVENTION

As is known in the machine tool trade, cutting tools are employed to make shallow cuts in work pieces for deep grooving or cutoff. These cutting tools are mounted in proper position on a conventional tool post on the compound rest of a turret or other engine lathe.

Sometimes, the cutoff surface or the groove surface of a work piece previously being operated on by the cutting tool, have to be chamfered at a designated angle for which conventionally a separate chamfer tool will be required. This conventional arrangement requires the cutoff tool to be removed from the tool post and subsequent readjustment and mounting of the chamfer tool on the tool post in proper position for chamfering.

Thus, in conventional cutoff and chamfering operations: (1) work stoppage is required (2) the cutoff tool must be removed from the tool post, (3) the chamfering tool has to be mounted on the tool post and, (4) the machine tool has to be readjusted in order for proper chamfering of the straight cut or grooved surface of the work piece. It will be appreciated that these multiple set-up operations are time consuming and consequently costly.

The present invention provides a combination cutoff and chamfer tool which can be preadjusted for proper cutting and subsequent chamfering operation without interchanging or replacing either tool, thus eliminating the normally tedious practice connected with conventional tool set-up.

Accordingly, the present invention provides a combination cutoff and chamfer tool assembly for combined or successive uninterrupted cutting and chamfering machining operations on a work piece in an engine lathe or similar machine tool.

The present invention provides a substantially conventional tool holder for mounting on the tool post or compound rest mechanism of an engine lathe or the like. The tool holder of the present invention is constructed to mount (1) a conventional cutting tool and (2) a chamfer tool in conjunction with and adjacent one side of said cutting tool. The improved chamfer tool of the present invention is longitudinally adjustable along the body of the cutting tool relative to the cutting edge of the cutting tool for proper predetermined chamfering operation immediately after the cutting operation. The chamfering tool can be utilized without interruption in the machining process to chamfer the previously cut surface of the work piece.

As mentioned above, the tool holder utilized for the present invention is of substantially conventional configuration to fit conventional engine and turret lathes. The improvement of the present invention resides in the provision of a specifically designed chamfer tool and tool clamp assembly associated with the tool holder to adjustably and securely clamp the pair of tools in appropriately adjusted predetermined position for uninterrupted cutting and chamfering machine operation.

The present invention will be best understood by reference to the following detailed description of a preferred embodiment thereof with reference to the attached drawings, illustrating the same.

BRIEF DESCRIPTION OF THE DRAWINGS

In the accompanying drawings:

FIG. 1 is a side elevation of the present improved combination cutoff and chamfer tool assembly shown in mounted position in a conventional tool holder;

FIG. 2 is a top plan view of the assembly of FIG. 1;

FIG. 3 is a left hand front elevation of the assembly of FIG. 1 showing the pair of tools in cross-section along line 3—3; and FIG. 4 is a right hand end view of the tool holder utilized with the present improved combination cutoff and chamfer tool assembly shown without the tools and tool clamp.

DETAILED DESCRIPTION OF THE INVENTION

With continuing reference to the drawings, the numeral 10 indicates a substantially conventional tool holder comprising a bar of substantially rectangular configuration. The tool holder 10, as known, is adapted to be mounted on a tool post of appropriate construction normally provided for on the compound of a lathe.

As particularly seen in FIGS. 1 and 4, the tool holder 10, at one side thereof is provided with an angularly inclined cut-out or recess 12 defining an inclined bottom surface 14. The inner, lateral surface of the longitudinal inclined recess 12 is shaped to provide a pair of parallel co-planar longitudinal ridges 16 and 18 respectively, which in between them define a groove 20. Ridges 16 and 18 and groove 20 all extend in inclined direction parallel to the bottom surface 14 of the recess.

Ridges 16 and 18 provide flat, co-planar surfaces 17 and 19, respectively, which are adapted to laterally support a cut-off tool 22. The cut-off tool 22 is in the form of a flat longitudinal, rectangular bar, having an enlarged upper rim portion 24. The lower edge of the cut-off tool 22 is supported on the inclined bottom surface 14 of the recess 12, whereby the co-planar flat surfaces 17—19 of the opposite parallel ridges 16 and 18 function to maintain the cut-off tool 22 in properly aligned vertical position in the tool holder 10.

Opposite of the inclined recess 12, the front portion 11 of the tool holder 10 is provided with a chamfered edge surface 26, which serves a function to appear hereafter.

In addition to the conventional cut-off tool 22, the present improved tool assembly is adapted to retain a chamfer tool 28 mounted in side-by-side relationshop with the cut-off tool 22. The chamfer tool 28 is similarly of substantially flat rectangular bar configuration and provides an inclined cutting edge 30.

As particularly seenin FIG. 3, the chamfer tool 28 has a flat lateral outer surface 32. The opposite parallel side of chamfer tool 28 is provided with a longitudinal groove 34 of rectangular cross-section adjacent the upper edge 36 of the chamfer tool. THe provision of longitudinal side groove 34 on the chamfer tool causes the formation of a longitudinal flange 38, extending along the upper edge of the chamfer tool. In assembly, the longitudinal groove 34 is adapted to receive the longitudinal upper rim portion 24 of the cutoff tool 22 in such manner, that the longitudinal upper edge flange 38 extends partly over the enlarged upper rim portion 24 of the cut-off tool 22, thus positioning the chamfer tool 28 in fixed vertical position relative to the cut-off tool 22. The main body portion of the chamfer tool 28 is adapted to flatly abut against the flat outer side of the cut-off tool 22 as shown.

In order to securely retain the pair of tools 22-28 in the tool holder 10 a unique, fast acting clamp assembly 40 is provided. Clamp assembly 40 is composed of a clamp member 42 which is substantially L-shaped in cross-section as illustrated in FIG. 3, providing a long side 44 and a shorter side 46 right angularily connected thereto. The long side 44 of the clamp member 42 overlies the top edges of the tool members 22-28 and the top surface 13 of the front end 11 of the tool holder 10. The end of the long side 44 opposite the short side 46 of the clamp, is provided with a flange portion 48 which has an inwardly inclined wedge surface 50 for cooperative mating engagement upon the matchingly inclined outer edge surface 26 of the front end 11 of the tool holder as shown in FIG. 3. As further seen in FIG. 3, in assembly of the clamp, the inner surface of the upper long side 44 of the clamp member rests upon the top edge 36 of the chamfer tool 28 while the inner surface of the shorter vertical side portion 46 of the clamp abuts against the outer surface 32 of the chamfer tool 28. Inwardly, the clamp member 42 is provided with an undercut 52 adjacent the joint between the sides 44 and 46 for stress relief upon application of the clamping force. The clamp member 42 is secured in position upon the front end 11 of the tool holder 10 by means of a bolt 54 which extends through the upper, long side 44 of the clamp member for threading engagement within an appropriate aperture (not shown) in the front end 11 of the tool holder 10.

In operation of the device, the cutting tool 22 and chamfer tool 28 are placed in longitudinal inclined recess 12 of the tool holder 10 in the position shown in FIG. 3 and such, that the cutting tool 22 is vertically supported in aligned square relationship relative to the bottom surface 14 of the lateral recess 12 against the co-planar flat abutment surfaces 17 and 19 respectively, of the pair of parallel ridges 16 and 18, respectively. The chamfer tool 28 is supported in similar aligned square relationship (relative to the surface 14 and to the cutting tool 22) against the flat outer surface of the cutting tool and along the top edges of the cutting tool by means of the longitudinal flange 38 abutting upon the top surfaces of the enlarged rim portion 24 of the cutting tool, which laterally extends into the groove 34 of the chamfer tool 28, all as shown in FIG. 3. The L-shaped clamp member 42 is then put in place in such manner that the long side 44 extends horizontally across the cutting tool 22 and chamfer tool 28 and across the top of the front section 11 of the tool holder 10, placing the inner wedge surface 50 of the flange portion 48 into engagement with the inclined surface 26 provided along the inner top edge of the front portion 11. In that position, the inner surface of the vertically disposed shorter side 46 of the clamp member 42 abuts against the flat outer surface 32 of the chamfer tool 28. Thereafter, the clamp bolt 54 is put in place for threading engagement into the front portion 11 of tool holder 10 to tighten the clamp member 42 upon the tool holder while simultaneously surrounding and retaining the pair of tool members 22–28.

As the bolt 54 is tightened, the mating inclined wedge surfaces 26–50, provided on the tool holder and the clamp member, cause the clamp member 42 to be displaced in transverse direction relative to the longitudinal center axis of the tool holder 10 to thereby securely clamp: (1) chamfer tool 28 against the side of the cutting tool 22; (2) clamp the inner side surface of the cutting tool 22 against the flat, co-planar abutment surfaces 17–19 of the longitudinal ridges 16 and 18, respectively, provided along the lateral inner side surface of the longitudinal recess 12 of tool holder 10. Simultaneously, upon tightening of bolt 54 (at a required predetermined torque) the clamp member 42 will be drawn downwardly towards the top surface 13 of front portion 11 of tool holder 10, causing tight clamping engagement of the longitudinal upper edge flange portion 38 of chamfer tool 28 upon the enlarged top rim portion 24 of cutting tool 22 by simultaneously clamping the lower edge surface of the cutting tool 22 upon the inclined tool holder recess surface 14.

Thus, in view of the unique construction of the chamfer tool 28 in conjunction with clamp assembly 40 the engagement between cooperative matchingly inclined wedge surfaces 26 and 50, upon tightening of bolt 54, cause the creation of clamping forces along two pair of vectors in directions intersecting each other at a right angle, as indicated by the arrows F1 and F2 in FIG. 3, to maintain the tool members 22–28 tightly secured to the tool holder 10 and thereby prevent any longitudinal or lateral displacement of either one or both of them during the subsequent machining operations.

In the machining operation of a workpiece which has to be grooved or cutoff and in which the side surface of the groove or the cut-off surface has to be subsequently chamfered, the cut-off tool 22 is employed first to make the required cut in the workpiece after which the cooperatively arranged chamfer tool 28 will be employed for the subsequent chamfering operation without interruption in the machining process.

By loosening of the bolt 54, the tools 22–28 can be adjusted longitudinally within the side recess 12 of the tool holder 10 relative to the tool holder and relative to each other in correspondence to the depth of the groove to be cut or the cross-sectional diameter of the workpiece to be cut-off, and in such fashion that, as soon as the cut is completed, the cutting edge 30 of the chamfering tool 28 will be in a position along the cut surface of the workpiece, to proceed with the chamfering operation without interruption.

Thus, it will be appreciated from the foregoing description in conjunction with the attached drawings, that the present improved combination cutoff and chamfering tool assembly provides a distinct advantage over conventional prior separate tool arrangements normally required for the separate cutoff and chamfering operations, to thereby eliminate machine shut down and subsequent related adjustments in machine set-up at reduced production time and cost.

Although the present invention has been described and shown by means of a preferred embodiment, it is obivous that various structural modifications may be made by a person skilled in the art to which the invention pertains without departing from the spirit and essential characteristic of the invention as defined in the appended claims.

I claim:

1. In combination with a tool holder for use in a machine tool of the type described, the improvement comprising: said tool holder having opposed sides; one of said sides being provided with a longitudinal, lateral recess extending from end to end; said recess having parallel top and bottom surfaces and an inner lateral surface between them; said inner lateral surface being provided with parallel longitudinally extending ridge portions each of which having a surface co-planar with each other and in a plane normal to the planes of said top and bottom surfaces of said recess; the other side of said tool holder being provided along the upper outer edge portion thereof with an inclined surface; first and second elongated tool members adapted for retainment longitudinally within said lateral recess for support upon said bottom surface and against said flat co-planar surfaces of said lateral ridge portions of said recess; said first and second elongated tool members being provided with means co-operatively engaging each other to coactingly retain said tool members in predetermined assembled position relative to each other; a clamp assembly adapted for securement to said tool holder having first means at one side thereof for securing said elongated tool members and second means at the opposite side thereof for engagement upon said inclined edge surface of said tool holder; said clamp assembly including clamp securing means cooperatively engaging said tool holder so that, when said clamp securing means are tightened, said first means and said second means of said clamp assembly operably and co-actingly function to tightly clamp said first & second elongated tool members to each other and against said co-planar lateral ridge surfaces and said bottom surface of said longitudinal lateral recess of said tool holder.

2. In the combination as defined in claim 1, said means of said first and second elongated tool members co-operatively engaging each other comprising:

said first tool member being provided with an upper longitudinal rim portion;

said second tool member having a longitudinal groove along one side thereof adjacent its upper edge;

said first and said second tool members adapted to be placed in side by side abutting relationship and in a position within said longitudinal lateral recess of said tool holder such that said first tool member abuts with one side against said flat surfaces of said ridge portions within said recess and rests upon said bottom surface whereby said upper longitudinal rim portion of said first tool member extends within said longitudinal groove of said second tool member so that a portion of the upper edge of said second tool member overlies the top of said rim portion of said first tool member to thereby support said second tool member on said first tool member;

said clamp assembly extending over said first and second tool member and in abutment with the top surface of said second tool member and;

said first means of said clamp assembly engaging the outer side of said second tool member whereby upon tightening of said securing means said clamp assembly is drawn downwardly and laterally inwardly whereby said overlying portion of said second tool member exerts a force on said first tool member in a direction downwardly towards said bottom surface of said lateral recess, and said first means in conjunction with said second means of said clamp assembly exerts a clamping force in lateral direction against the side of said second tool member and said first tool member against said flat surfaces of said ridge portions of said lateral recess in said tool holder.

3. In the combination as defined in claim 1, said clamp assembly comprising a substantially L-shaped member having a long side overlying said first and second tool members and a portion of said tool holder, and a short side disposed at a right angle thereto for overlying extension across portions of said lateral recess of said tool holder; said short side defining said first means adapted for engagement against the outside of said second tool member; said second means comprising a wedge portion extending from said long side of said L-shaped clamp member; said wedge portion having an inclined surface matching said inclined edge surface of said tool holder for cooperative wedging engagement therewith so that upon tightening of said securing means said wedge portion of said clamp assembly in conjunction with said inclined edge surface of said tool holder functions to draw said L-shaped clamp member laterally inwardly to force said first and second tool members inwardly of said recess in clamping engagement against said flat surface of said ridge portions of said recess.

4. In the combination as defined in claim 1, said clamp securing means comprising a threaded member extending from the top through said clamp assembly for threading engagement within said tool holder so that upon tightening of said threaded member said clamp assembly will be drawn downwardly upon said tool holder.

5. In the combination as defined in claim 1, said first elongated tool member comprising a cutoff tool having a cutting edge; said second elongated tool member comprising a chamfering tool having an inclined cutting edge; said means cooperatively engaging each other comprising a longitudinal rim portion on said first tool member and a longitudinal groove provided along one side of said second tool member to slidingly receive said rim portion of said first tool member for disposal of said first and second tool member in side-by-side relationship and to permit longitudinal adjustment of said tool member relative to each other in longitudinal direction only to thereby vary the relative distance between the cutting edge of said chamfering tool and the cutting edge of said cutoff tool.

* * * * *